March 19, 1940. W. E. ROBERTS 2,193,938
VEHICLE HITCH
Filed May 11, 1939
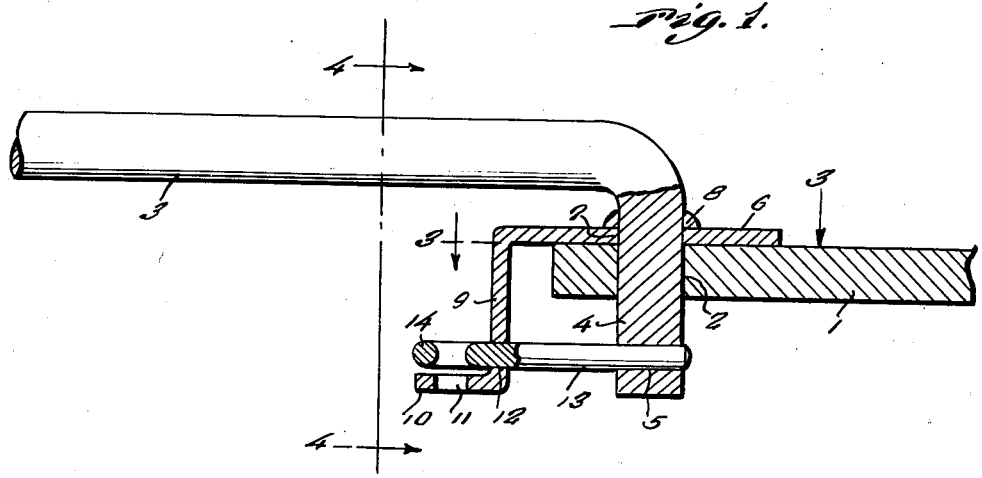
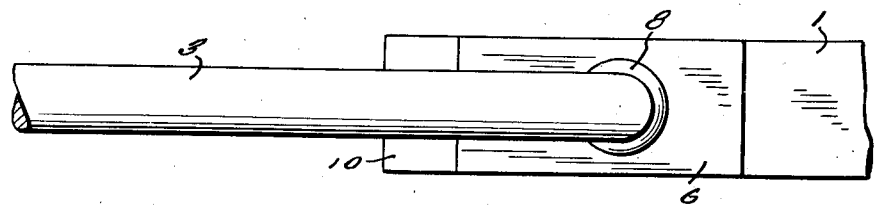
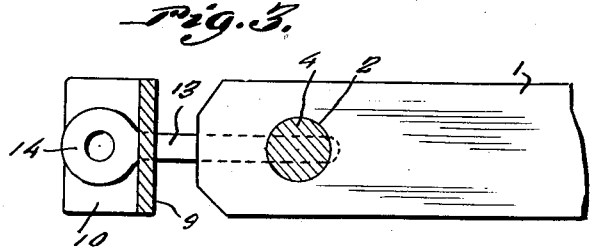
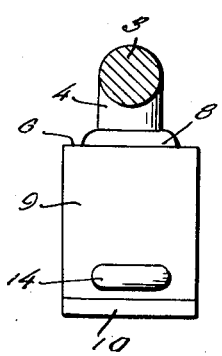
Inventor
W. E. Roberts
By Clarence A. O'Brien
and Hyman Berman
Attorneys Patented Mar. 19, 1940

2,193,938

UNITED STATES PATENT OFFICE 2,193,938

VEHICLE HITCH

William E. Roberts, Kirbyville, Tex.

Application May 11, 1939, Serial No. 273,079

3 Claims. (Cl. 280—33.15)

The present invention relates to new and useful improvements in hitches for trailers, farm implements, etc., and has for its primary object to provide, in a manner as hereinafter set forth, a device of this character embodying novel locking means.

Another very important object of the invention is to provide a hitch of the aforementioned character which may be expeditiously connected and disconnected without the use of tools.

Other objects of the invention are to provide a hitch of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view principally in longitudinal section through a hitch constructed in accordance with the present invention.

Figure 2 is a top plan view of the device.

Figure 3 is a view in horizontal section, taken substantially on the line 3—3 of Fig. 1.

Figure 4 is a cross sectional view, taken substantially on the line 4—4 of Fig. 1.

Referring now to the drawing in detail, it will be seen that the reference numeral 1 designates a drawbar which is to be secured in any suitable manner to the rear end of a towing vehicle, such as an automobile or tractor. Extending vertically through the rear end portion of the draw bar 1 is an opening 2. This is best seen in Fig. 1 of the drawing.

The reference numeral 3 designates the forward end portion of a tongue from a trailer, farm implement or the like, said tongue being in the form of a metallic rod of circular cross section of any suitable diameter. At its forward end, the tongue 3 terminates in a downturned hook 4 which is engageable in the opening 2, thus pivotally and detachably connecting said tongue to the draw bar 1. The hook 4 has formed in its lower end portion an opening 5 the purpose of which will be presently set forth.

Mounted horizontally on an upper portion of the hook 4 is an elongated metallic plate 6 which is adapted to rest on the drawbar 1. The plate 6 has formed therein an opening 7 which accommodates the hook 4, said plate rigidly fixed on said hook by welding, as at 8.

The plate 6 is provided with a depending rear end portion 9 which terminates, at its lower end, in a rearwardly extending horizontal flange 10 having an opening 11 therein. The lower portion of the depending portion 9 of the plate 6 has formed therein an opening 12 for alignment with the opening 5 in the hook 4.

The reference numeral 13 designates a pin which is insertable through the opening 12 for engagement in the opening 5 in a manner to anchor the hook 4 in the drawbar 1. On its rear end the pin 13 is provided with an eye 14 which is aligned with the opening 11 for the reception of a suitable lock (not shown) for preventing unauthorized removal of said pin.

It is thought that the manner in which the hitch functions will be readily apparent from a consideration of the foregoing. Briefly, to connect the tongue 3 to the drawbar 1 the hook 4 is inserted downwardly through the opening 2 and the plate 6 comes to rest on said drawbar. It will thus be seen that the tongue 3 is free to swing relative to the drawbar. It will also be observed that the weight of the tongue 3 is carried by the plate 6. The pin 13 is then inserted through the opening 12 and engaged in the opening 5 thereby positively anchoring the tongue 4 in the drawbar. The aforementioned lock is then inserted through the eye 14 and the opening 11 in the flange 10 for securing the pin 13 in position. Of course, to disconnect the tongue 3 it is only necessary to remove the pin 13 and lift the hook 4 out of the opening 2 in the drawbar 1.

It is believed that the many advantages of a hitch constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A hitch of the character described comprising a tongue, a hook on said tongue engageable in a drawbar, a plate fixed on the hook and adapted to rest on the drawbar, said hook having an opening therein, and a pin mounted on the plate and engageable in the opening for anchoring the hook in the drawbar.

2. A hitch of the character described comprising a tongue, a hook on one end of said tongue engageable in a drawbar, a plate mounted on the hook, said hook having an opening therein spaced from the plate, a flange on the plate having an opening therein, and a pin removably mounted on the plate and engageable in the first named opening for anchoring the hook in the drawbar, said pin including an eye on one end for alignment with the second named opening for the reception of a lock for securing said pin in operative position.

3. A hitch of the character described comprising a tongue, a hook on one end of the tongue engageable in a drawbar, said hook having an opening in its free end portion, a plate fixed on the hook in spaced relation to the opening and adapted to rest on the drawbar, said plate including a depending end portion having an opening therein for alignment with the first named opening, an angularly projecting flange on the lower end of said depending portion of the plate, said flange having an opening therein, and a removable pin insertable through the second named opening and engageable in the first named opening for anchoring the hook in the drawbar, said pin including an eye on one end for alignment with the third named opening for receiving a lock for securing said pin in operative position.

WILLIAM E. ROBERTS.